United States Patent [19]

Pringle

[11] 4,161,240

[45] Jul. 17, 1979

[54] RATCHET ACTION SLACK ADJUSTER

[75] Inventor: William L. Pringle, Grosse Pointe Shores, Mich.

[73] Assignee: United States Steel Corporation, Pittsburgh, Pa.

[21] Appl. No.: 870,331

[22] Filed: Jan. 18, 1978

[51] Int. Cl.$^2$ .................................................. F16D 65/54
[52] U.S. Cl. ........................... 188/196 BA; 188/79.5 K
[58] Field of Search .................. 188/79.5 GE, 79.5 K, 188/196 B, 196 BA

[56] References Cited

U.S. PATENT DOCUMENTS

| | | | |
|---|---|---|---|
| 1,525,568 | 2/1925 | Chapin | 188/79.5 K |
| 1,860,770 | 5/1932 | Bugatti | 188/79.5 K |
| 2,296,026 | 9/1942 | Freeman | 188/79.5 K |
| 2,379,796 | 7/1945 | Freeman et al. | 188/79.5 K X |

*Primary Examiner*—Duane A. Reger
*Attorney, Agent, or Firm*—McGlynn and Milton

[57] ABSTRACT

A ratchet action slack adjuster assembly for use with cam operated brakes. The assembly includes a rotatable actuating shaft for actuating a braking means and has a portion containing ratchet teeth. An actuator is mounted on the actuating shaft for providing input to the rotatable actuating shaft by arcuate movement. The actuator includes two identically stamped lever halves having dish-shaped base portions which define a cavity when the halves are fastened together. A plurality of pawl members engaging the ratchet teeth of the actuating shaft are disposed in the cavity and are pivotally supported by the lever. An annular adjustment member is axially spaced for mounting independently of the actuator on a support structure for lost rotary motion relative to the lever and the actuating shaft. The annular adjustment member has a ring portion with flanges which yieldably engage the ratchet teeth of the actuating shaft for preventing return rotation of the actuating shaft after it has rotated a predetermined amount defined by the ratchet teeth and has ratcheted to a new rest position. The annular adjustment member has a radially extending flange with holes for receiving bolts for mounting the adjustment member to a fixed support member. The holes are larger than the bolts to allow limited lost motion of the adjustment member relative to the support member.

18 Claims, 5 Drawing Figures

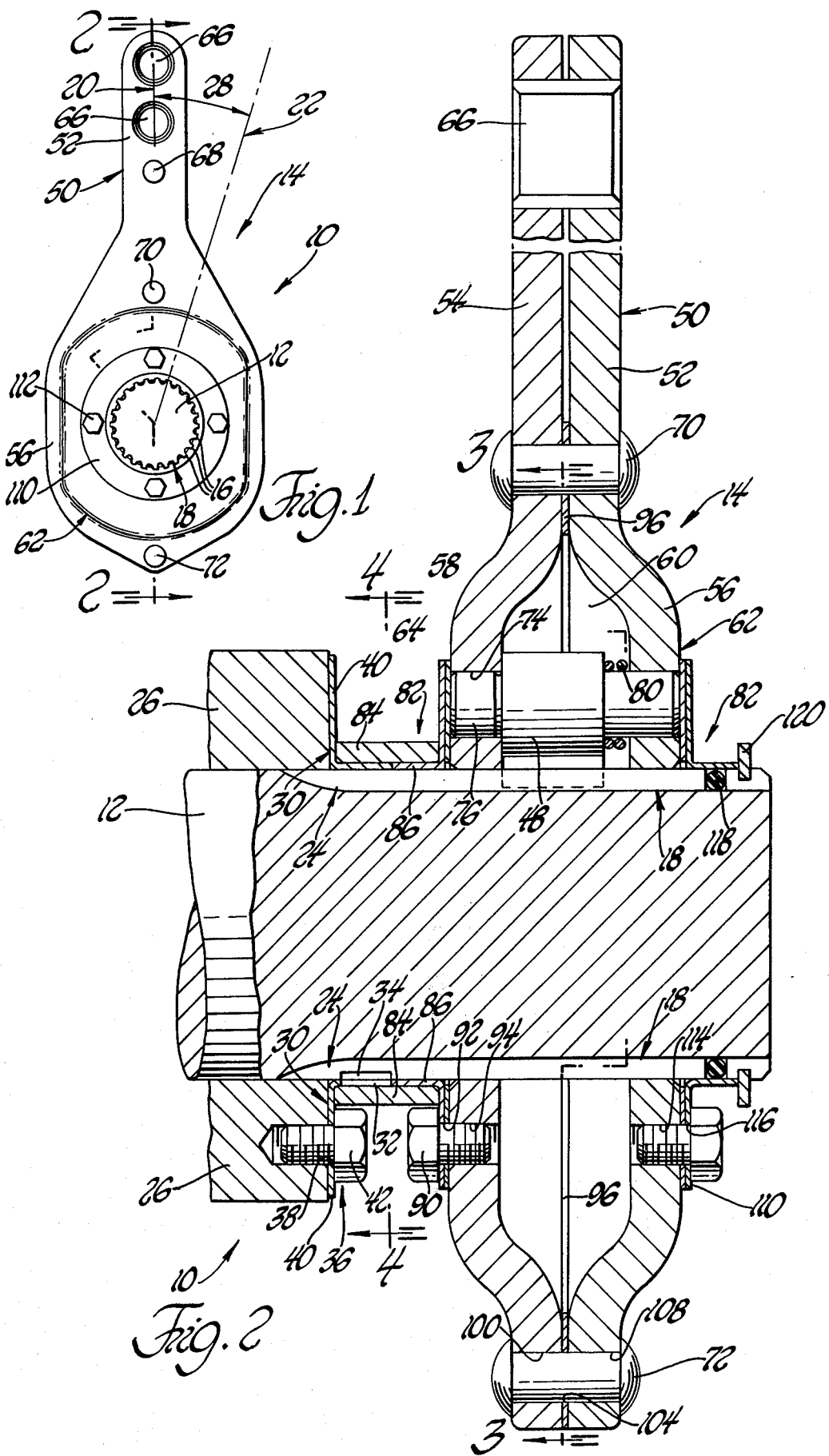

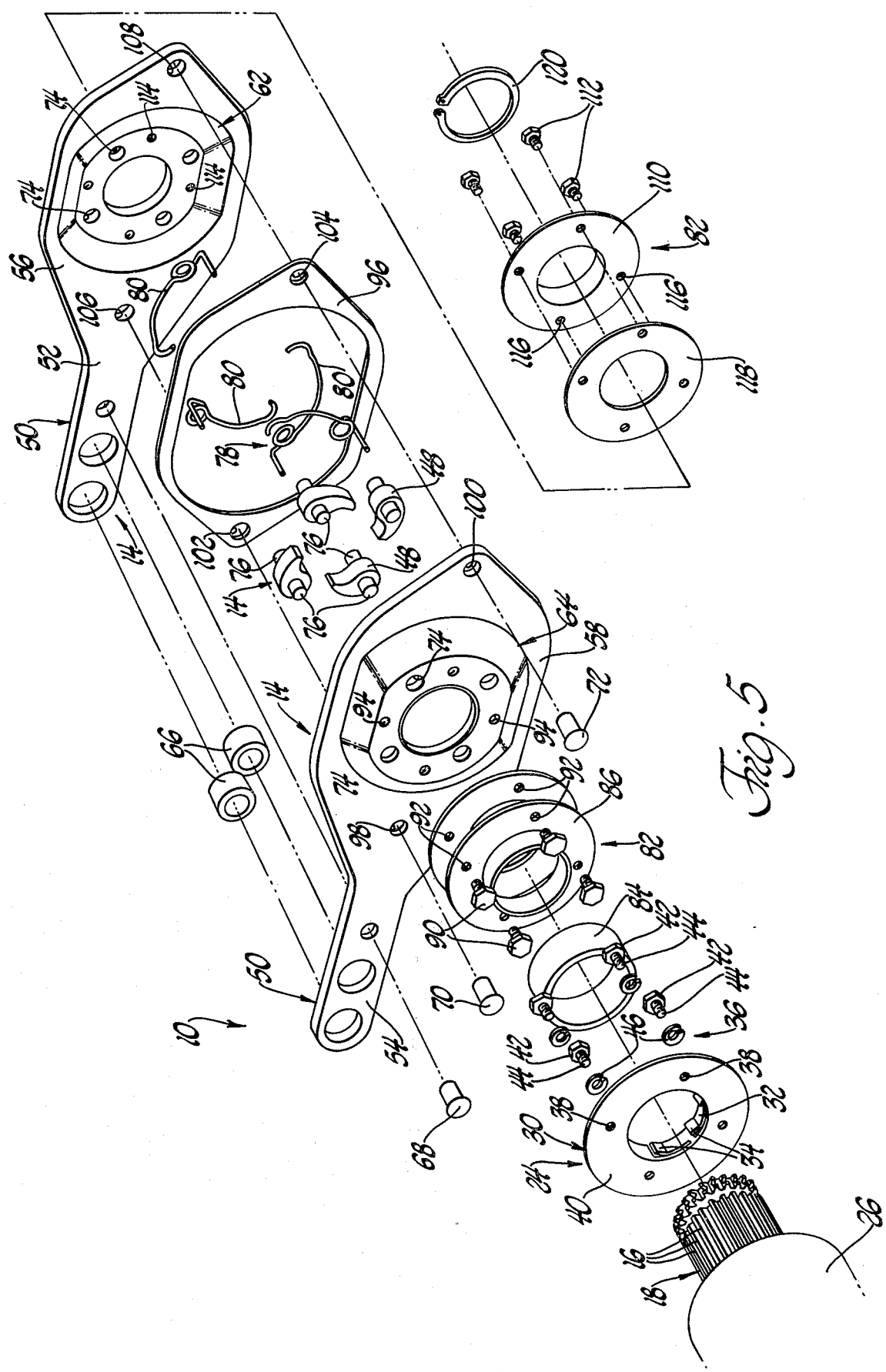

RATCHET ACTION SLACK ADJUSTER

BACKGROUND OF THE INVENTION

(1) Field of the Invention

The subject invention relates to an improved automatic slack adjuster which employs ratchet action. Typical braking systems employ shoes and drums or discs and pads which can be activated into frictional contact. After a period of time and use, brake linings or pads wear down and as a result, the brake shoes or pads must extend a further distance in order to come in contact with their cooperating components. It is desirable to vary the angular position of the actuating shaft or piston of brakes relative to an actuator means when the lining or pads wear so as to advance the retracted position of shoes or pads toward the drum or discs to maintain a desired clearance without changing the position of the actuator means so that the actuator travel remains constant during brake actuation regardless of lining or pad wear.

(2) Description of the Prior Art

Typically, the prior art slack adjusters employ a pawl and ratchet principle, however, the prior art slack adjusters are complex in structure and are not economically and easily manufactured.

SUMMARY OF THE INVENTION

The subject invention relates to an improved ratchet action slack adjuster having a rotatable actuating shaft displaceable from a rest position for actuating a braking means and having a portion containing ratchet teeth. Actuator means having an initial position and brake-applied positions is mounted on the actuating shaft for providing input to the rotatable actuating shaft by arcuate movement of the actuator means. An adjustment means is axially spaced for mounting independently of the actuator means on a support means for lost rotary motion relative to the actuator means and the actuator shaft in order to prevent return rotation of the actuating shaft after the actuating shaft has rotated a predetermined amount corresponding to a desired amount of play in a braking means.

PRIOR ART STATEMENT

An automatic slack adjuster is shown in U.S. Pat. No. 3,154,178, granted Oct. 27, 1964 to B. E. House et al. This patent discloses an assembly in which a base of a lever is connected in motion transmitting relation through spring-loaded radial drive plates to drive an annular member which rotates a cam shaft due to a splined connection. The adjustment member in this patent, however, rotates with the cam shaft and rotation of the adjustment member is limited to a definite angle by the provision of abutment bosses on the adjustment member, between which extends a fixed pin. In the same vein, U.S. Pat. No. 2,109,284, granted Feb. 22, 1938 to E. J. M. Brinck et al discloses a slack adjuster assembly wherein a cam shaft is keyed to a ratchet wheel is driven by a single spring-loaded pawl member which translates motion from a lever to the ratchet wheel. The adjustment member includes a second spring-loaded pawl member but again, the adjustment member has abutment bosses with a fixed pin extending therebetween in order to limit rotation of the adjustment member to a definite angle, and further, this patent does not disclose a plurality of pawl members or an annular adjustment member having a plurality of flanges. A slack adjuster assembly employing a fixed adjustment flange is shown in U.S. Pat. No. 3,851,737, granted Dec. 3, 1974 to James A. Hewins. The assembly disclosed in this patent, however, has a separate distinct ratchet wheel which cooperates with the adjustment flange. Thus, this patent does not disclose an assembly wherein the adjustment member cooperates with an actuating shaft containing ratchet teeth or the axially spaced relationship of the actuator means and the adjustment means. In summary, the prior art does not suggest a slack adjuster with a combination of components of the subject invention which, in turn, allows the components to be efficiently and economically manufactured and assembled.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational end view of a ratchet action slack adjuster assembly constructed in accordance with the instant invention;

FIG. 2 is a front view partially broken away and in cross section and taken substantially along line 2—2 of FIG. 1;

FIG. 5 is an expanded perspective view of the components shown in FIG. 2 revealing the order of assembly thereof.

DESCRIPTION OF THE PREFERRED EMBODIMENT

Referring to FIGS. 1 and 2, a ratchet action slack adjuster assembly is generally shown at 10. The assembly 10 includes an actuating shaft 12 and an actuator means generally shown at 14.

The actuating shaft 12 acts on jaws or shoes in a conventional manner for jaw brakes, but the assembly 10 is also applicable for any member which controls the opening of the jaws or the application of a disc brake. In the case of jaw brakes, the jaws or shoes are typically returned to the released position by a return means such as a spring. The actuator means 14 is connected with a mechanical linkage or is hydraulically operated and, in any event, is associated with a typical brake pedal, hand lever or the like. The assembly 10 will automatically advance the retracted or release position of the brake shoes toward the drum in order to maintain the desired clearance between the lining and the drum without changing position of the actuator means 14 so that the actuator means 14 travel remains constant during brake actuation regardless of lining wear. Thus, the driver of a vehicle will consistently have a desired amount of play in a typical brake pedal and the brake pedal will not be required to be depressed increasingly further distances in order to cause brake shoes to come in contact with the lining, regardless of the wear of the brake linings. In short, the assembly 10 will compensate for the slack or increased distance which the brake shoe must travel in order to contact a worn-down lining.

Figure 3:
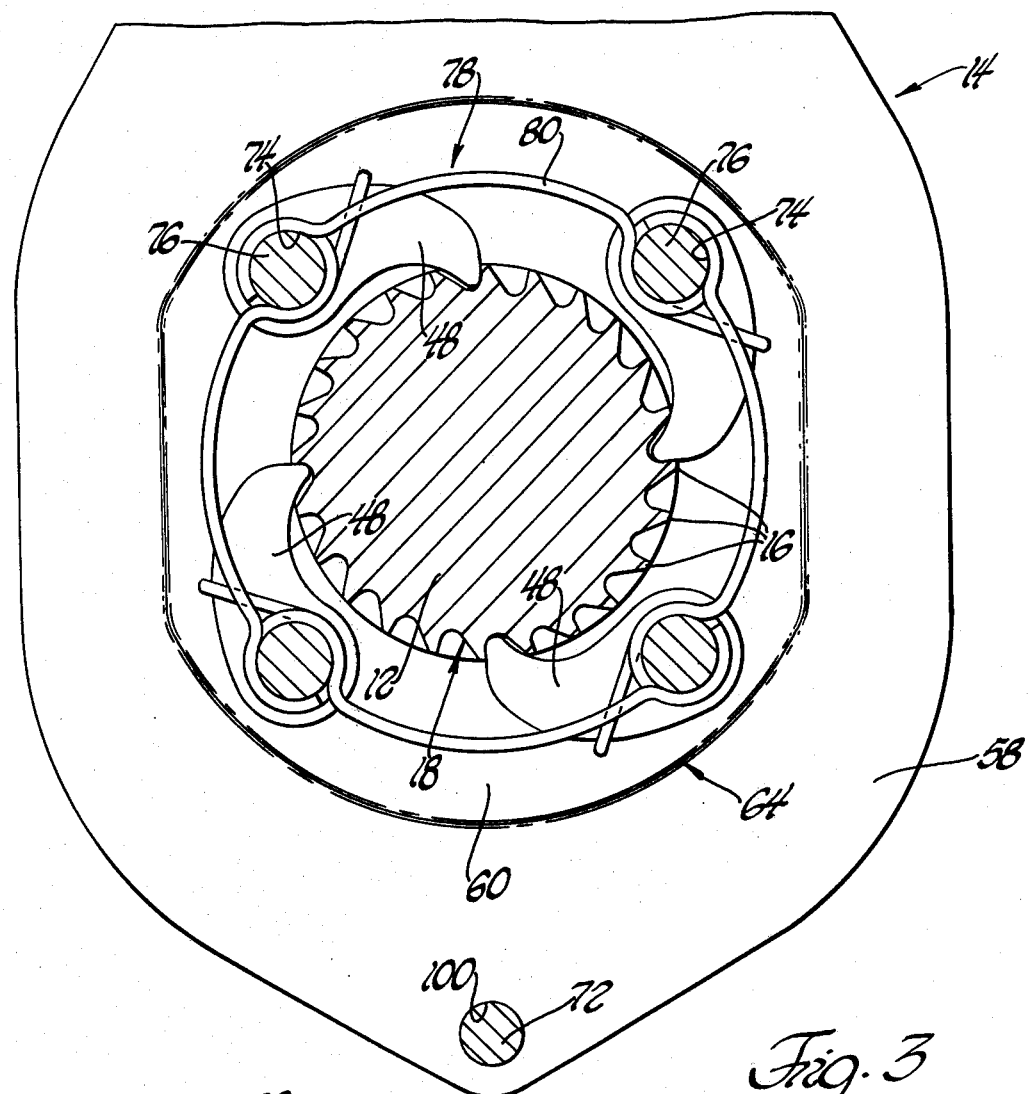
FIG. 3 is a fragmentary cross-sectional view taken substantially along line 3—3 of FIG. 2.
Figure 4:
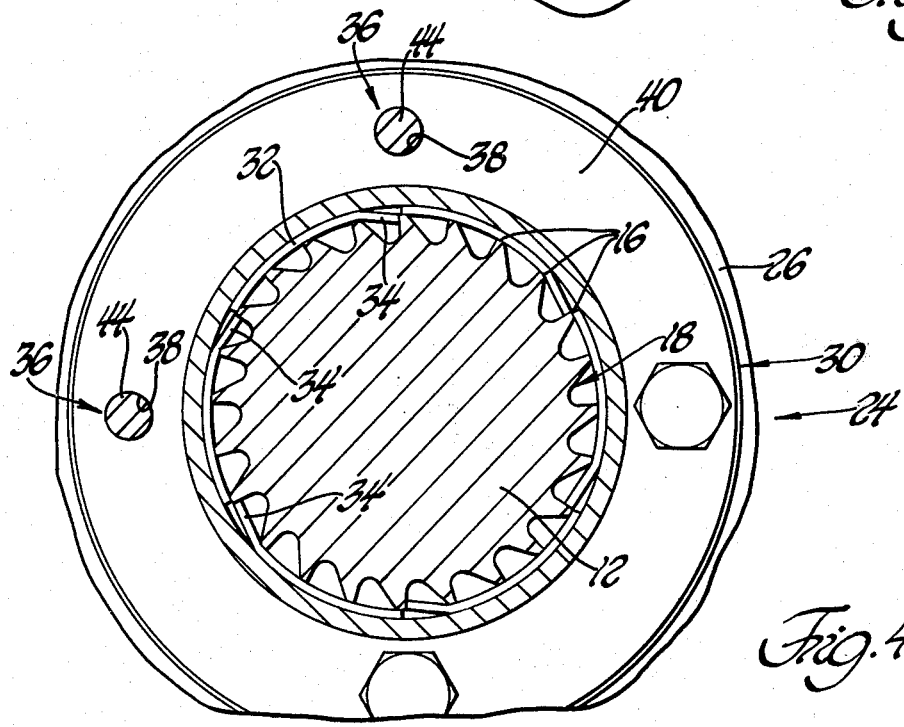
FIG. 4 is a fragmentary cross-sectional view taken substantially along line 4—4 of FIG. 2.

Referring to FIGS. 1, 3 and 4, the actuating shaft 12 has ratchet teeth which are indicated at 16. More specifically, in the preferred embodiment shown in FIG. 2 the actuating shaft 12 has a portion containing ratchet teeth directly on the actuating shaft itself and this portion is the grooved-out area generally indicated at 18. It is also possible, however, that the ratchet teeth 16 may be on a separate member which is keyed in a known manner to an actuating shaft.

Referring to FIG. 1, the actuating shaft 12 is rotatable and has a rest position which is indicated by the section or radial line 20. The actuating shaft 12 is displaceable from its rest position 20 in order to actuate a braking means by, for example, causing jaws or shoes to come into contact with the lining of a brake drum. The actuator means 14 has an initial position indicated by the line 20 and a brake-applied position which is indicated by the section or radial line 22. The actuator means 14 is mounted on the actuating shaft 12 for providing input to the rotatable actuating shaft 12 by arcuate movement of the actuator means 14.

As shown in FIG. 2, an adjustment means generally shown at 24 is axially spaced for mounting independently of the actuator means 14 on a support means 26 for lost rotary motion relative to the actuator means 14 and the actuating shaft 12. The support means 26 includes a portion of the vehicle frame structure, a housing, or an equivalent fixed or permanent structure. The adjustment means 24 prevents return rotation of the actuating shaft 12 after the actuating shaft 12 has rotated a predetermined amount corresponding to a desired amount of play in a braking means. Thus, the actuating shaft will cause the jaws or shoes to have a new retracted or rest position which is closer to the drums which will compensate for slack or increased distance of the shoes from the lining when the lining is worn.

Referring again to FIG. 1, the ratchet teeth 16 are circumferentially spaced in increments to provide the predetermined amount of rotation of the actuating shaft 12 which corresponds to the desired amount of play in a brake assembly. In addition, the ratchet teeth 16 are spaced in such a manner as to correspond to the arcuate movement of the actuator means 14 so that the degree of arcuate movement of the actuator means 14 will accomplish a corresponding degree of rotation of the ratchet teeth 16 and, in turn, the actuating shaft 12. By way of example, if a predetermined amount of arcuate movement of the actuator means 14 is about 15° as indicated by the arrow 28 and which manifests itself to the driver of a vehicle as the limit of a desired amount of play in a brake pedal, the section lines 20 and 22 illustrate that the ratchet teeth 16 and actuating shaft 12 will also move the same degree of rotation. After this point, the adjustment means 24 will prevent return rotation of the actuating shaft 12 which compensates for slack or brake lining wear.

Referring to FIGS. 4 and 5, the adjustment means 24 includes an annular adjustment member 30 which has an axially extending ring portion 32 and radially inwardly extending flanges 34. As best illustrated in FIG. 4, the radially inwardly extending flanges 34 yieldably engage the ratchet teeth 16 of the actuating shaft 12 for preventing return rotation of the actuating shaft 12 after the actuating shaft 12 has rotated the above-discussed predetermined amount defined by the ratchet teeth 16 and has ratcheted to a new rest position which, in turn, provides a new retracted or release position of the shoes relative to the lining of the drums.

Referring to FIGS. 2, 4 and 5, the adjustment means 24 includes lost motion means generally shown at 36 which allows the above-mentioned lost rotary motion between the adjustment means 24 and the support means 26 in order to prevent a braking means from being locked in a brake-engaging position. In other words, this feature assures that a brake assembly will not be locked in the "on" position to cause distortion in the drums, heating, or similar conditions. More specifically and referring to FIGS. 4 and 5, the annular adjustment member 30 includes the lost motion means 36 for mounting the annular adjustment member 30 independently of the actuator means 14 on the fixed support means 26 for allowing lost rotary motion.

The lost motion means 36 comprises holes 38 in a radially extending flange 40 of the annular adjustment member 30 and bolts 42 to extend therethrough and engage the support means 26. The holes 38 in the radially extending flange 40 are larger than the bolts 42, or, more specifically, the shafts 44 of the bolts 42. Since the holes 38 are larger than the bolts 42, this allows limited lost motion of the adjustment means 24 relative to the support means 26 which provides the lost rotary motion. Open-ring or lock washers 46 are included between the head of the bolt 42 and the flange 40 but do not prevent the limited lost motion of the adjustment means 24 relative to the support means 26. It is also possible to have resilient inserts disposed in the holes 38 to surround the bolts 42.

Since the outer annular adjustment member 30 is allowed to rotate back toward the initial position a slight amount after a ratcheting occurs between the flanges 34 and ratchet teeth 16 of the actuating shaft 12, this assures that the brakes are not locked in the brake-engaging position. Said another way, the lost motion means 36 allows limited rotation of the actuating shaft 12 a sufficient amount so that the shoes and drums are not locked into engagement.

Turning now to a more detailed description of the actuator means 14 and referring to FIGS. 2, 3 and 5, the actuator means 14 includes a plurality of pawl members 48 which engage the actuating shaft 12 for providing transmission of input from the actuator means 14 to the actuating shaft 12. In addition, pawl members 48 allow return of the actuator means 14 to its initial position (line 20 of FIG. 1) after being released from a brake-applied position (one of which is indicated by line 22 of FIG. 1). More importantly, the pawl members 48 also allow return to the actuator means 14 to the above-indicated initial position after the actuating shaft 12 has ratcheted to and is held in a new rest position by the flanges 34 of the annular adjustment member 30.

Referring to FIGS. 2 and 5, the actuator means 14 includes a lever generally indicated at 50 which includes two identically stamped lever halves 52 and 54 which extend into dish-shaped base portions 56 and 58. The dish-shaped base portions 56 and 58 define a cavity 60 and is best seen in FIG. 2. The dish-shaped part of the base portions 56 and 58 which from the cavity 60 are generally indicated at 62 and 64, respectively. Thus, the actuator means 14 may be fabricated from identically-stamped halves which may be fastened together by bushings 66 and rivets 68, 70 and 72. The lever 50 is spaced axially along the actuating shaft 12 from the adjustment means 24 and is freely rotatable relative thereto. Thus, since adjustment means 24 is mounted on the fixed support means 26, the adjustment means 24 may be independently mounted from the actuator means 12 and have lost rotary motion relative to the actuator means 14 and actuating shaft 12.

The actuator means 14 further includes pivotal support means for pivotally supporting the pawl members 48 on the base portions 56 and 58 of the lever 50 with the pawl members 48 being disposed in the cavity 60. Referring to FIGS. 2, 3 and 5, the pivotal support means includes the base portions 56 and 58 having support holes 74 in the respective dish-shpaed portions 62 and 64. The pawl members have stub shafts 76 extending from opposite sides thereof and are rotatably disposed in the support holes 74 whereby the pawl members 48 are pivotally disposed in the cavity 60.

The actuator means 12 also includes biasing means for urging the pawl members 48 into engagement with the ratchet teeth 16 to rotate the actuating shaft 12 when the actuating means 14 is in one of its brake-applied positions 22. However, since the pawl members 48 are pivotally supported by the lever 50 by the stub shafts 76 being rotatably disposed in the support holes 74, the biasing means allows the pawl members 48 to slide over the ratchet teeth 16 to provide return to the actuator means 14 to its initial position 20 even when the actuating shaft 12 has ratcheted to and is held in a new forward position by the adjustment means 24.

The biasing means includes a spring assembly generally shown at 78 wherein a spring 80 is disposed about one stub shaft 76 of each of the pawls 48 and reacting between each pawl 48 and a stub shaft 76 of an adjacent pawl 48. In the preferred embodiment shown in FIGS. 3 and 5 the actuator means 14 includes four spring-loaded pawl members 48 but other numbers may be included.

Referring to FIGS. 2 and 5, sealing means generally shown at 82 enclose the operative components including the portion 18 of the actuating shaft 12 having the ratchet teeth 16. The sealing means 82 includes annular sealing members 84 and 86 disposed axially between the annular adjustment member 30 and the base portion 58 of one of the halves 54 of the lever 50. One of the annular sealing members 86 is fixedly connected to the base portion 58 and is rotatable therewith. The annular sealing member 86 may be connected by threaded bolts 90 threadedly engaging corresponding holes 92 and 94 in the sealing member 86 and the base portion 58, respectively.

The sealing means 82 also includes an annular sealing ring 96 between the base portions 56 and 58. The annular sealing ring 96 is connected to the base portions 56 and 58 by the rivets 70 and 72 which are disposed in appropriate holes 98 and 100 of base portion 58, holes 102 and 104 of annular sealing ring 96 and holes 106 and 108 of base portion 56.

The sealing means 82 further includes a retainer member 110 fixedly connected by threaded bolts 112 threadedly engaging holes 114 in the base portion 56 through holes 116 in the retainer member 110 in order that the retainer member 110 is rotatable with the base portion 56. An O-ring 118 between the retainer member 110 and the actuating shaft 12 is also employed for sealing the actuating shaft 12 and a lock ring 120 mounted on shaft 12 aids in holding the aforementioned members in place.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A ratchet action slack adjuster assembly comprising; a rotatable actuating shaft displaceable from a rest position for actuating a braking means and having ratchet teeth extending axially along a portion of said shaft, actuator means having an initial position and brake-applied positions mounted on said actuating shaft and coacting with said ratchet teeth for providing input to said rotatable actuating shaft by arcuate movement of said actuator means, adjustment means extending about said shaft and being axially spaced along said shaft from said actuator means for mounting independently of said actuator means on a support means for rotary motion relative to said actuator means and relative to said actuating shaft and coacting with said ratchet teeth at a position spaced axially along said shaft for preventing return rotation of said actuating shaft after said actuating shaft has rotated a predetermined amount corresponding to a desired amount of play in a braking means.

2. An assembly as set forth in claim 1 wherein said adjustment means includes lost motion means for allowing limited rotary motion between said adjustment means and the support means to prevent the braking means from being locked in a brake-engaging position.

3. An assembly as set forth in claim 1 wherein said adjustment means includes an annular adjustment member having a ring portion with flanges yieldably engaging said ratchet teeth of said actuating shaft for preventing return rotation of said actuating shaft after said actuating shaft has rotated said predetermined amount defined by said ratchet teeth and has ratcheted to a new rest position.

4. An assembly as set forth in claim 3 wherein said annular adjustment member includes lost motion means for mounting said annular adjustment member on the support means for allowing limited rotary motion of said annular adjustment member relative to said support means.

5. An assembly as set forth in claim 4 wherein said lost motion means comprises holes in a radially extending flange of said annular adjustment member and bolts to extend therethrough and engage the support means.

6. An assembly as set forth in claim 5 wherein said holes are larger than said bolts to provide said lost rotary motion.

7. An assembly as set forth in claim 3 wherein said actuator means includes a plurality of pawl members engaging said ratchet teeth of said actuating shaft for providing transmission of said input from said actuator means to said actuating shaft and for allowing return to said actuator means to said initial position after being released from one of said brake-applied positions.

8. An assembly as set forth in claim 7 wherein said actuator means includes two identically stamped lever halves extending into dish-shaped base portions, said dish-shaped base portions defining a cavity when said halves are fastened together.

9. An assembly as set forth in claim 8 wherein said actuator means includes pivotable support means for pivotally supporting said pawl members on said base portions, said pawl members being disposed in said cavity.

10. An assembly as set forth in claim 9 wherein said pivotal support means includes stub shafts extending from opposite sides of said pawl members and said base portions having support holes therein, said stub shafts being rotatably disposed in said support holes.

11. An assembly as set forth in claim 10 wherein said actuator means includes biasing means for urging said pawl members into engagement with said ratchet teeth and for allowing said pawl members to slide over said ratchet teeth to provide said return of said actuator means to said initial position when said actuating shaft is in said new position.

12. An assembly as set forth in claim 11 wherein said biasing means includes a spring disposed about one of said stub shafts of each of said pawl members and reacting between each pawl and a stub shaft of an adjacent pawl.

13. An assembly as set forth in claim 12 wherein said actuator means includes four spring-loaded pawl members.

14. An assembly as set forth in claim 11 including sealing means for sealing said portion of said actuating shaft having said ratchet teeth.

15. An assembly as set forth in claim 14 wherein said sealing means includes annular sealing members disposed axially between said outer annular adjustment member and one of said halves of said base portion, one of said annular sealing members being fixedly connected to said base portion and rotatable therewith.

16. An assembly as set forth in claim 15 wherein said sealing means includes an annular sealing ring between said base portions.

17. An assembly as set forth in claim 16 wherein said sealing means further includes a retainer member fixedly connected to the other of said halves of said base portion and rotatable therewith, and an O-ring between said retainer member and said actuating shaft for sealing said actuating shaft.

18. A ratchet action slack adjuster assembly comprising; an actuating shaft having a portion containing a plurality of axially extending ratchet teeth spaced circumferentially thereabout, an annular adjustment member having a radially extending flange with holes therethrough for receiving bolts for mounting said adjustment member to a fixed support member with the holes being larger than the bolts to allow limited lost motion of said adjustment member relative to the support member, said adjustment member including an axially extending ring portion and radially inwardly extending flanges yieldably engaging said ratchet teeth of said actuating shaft, a lever disposed about and extending radially from said actuating shaft, said lever being spaced axially along said actuating shaft from said adjustment member and being freely rotatable relative thereto, a plurality of pawls pivotally supported by said lever and engaging said ratchet teeth of said actuating shaft, said lever comprising two identical lever halves having dish-shaped base portions, said dish-shaped base portions defining a cavity when said halves are fastened together, said base portions of said lever halves having support holes therein and said pawls being disposed in said cavity, said pawls including stub shafts extending from opposite sides thereof and rotatably disposed in said support holes, and a spring disposed about one stub shaft of each of said pawls and reacting between each pawl and a stub shaft of an adjacent pawl.

* * * * *